March 19, 1963   J. W. MARSHALL   3,081,707
ROTARY PUMPS AND COMPRESSORS, AND LIKE ROTARY MACHINES
Filed March 31, 1960   12 Sheets-Sheet 1

FIG. 1.

Inventor
John Wilmott Marshall
By
Dowell & Dowell
Attorneys

March 19, 1963     J. W. MARSHALL     3,081,707
ROTARY PUMPS AND COMPRESSORS, AND LIKE ROTARY MACHINES
Filed March 31, 1960     12 Sheets-Sheet 2

March 19, 1963 J. W. MARSHALL 3,081,707
ROTARY PUMPS AND COMPRESSORS, AND LIKE ROTARY MACHINES
Filed March 31, 1960 12 Sheets-Sheet 6

FIG. 8.

March 19, 1963     J. W. MARSHALL     3,081,707
ROTARY PUMPS AND COMPRESSORS, AND LIKE ROTARY MACHINES
Filed March 31, 1960     12 Sheets-Sheet 8

March 19, 1963  J. W. MARSHALL  3,081,707
ROTARY PUMPS AND COMPRESSORS, AND LIKE ROTARY MACHINES
Filed March 31, 1960  12 Sheets-Sheet 10

March 19, 1963  J. W. MARSHALL  3,081,707
ROTARY PUMPS AND COMPRESSORS, AND LIKE ROTARY MACHINES
Filed March 31, 1960  12 Sheets-Sheet 11

FIG. 14.

United States Patent Office 3,081,707
Patented Mar. 19, 1963

3,081,707
ROTARY PUMPS AND COMPRESSORS, AND LIKE
ROTARY MACHINES
John Wilmott Marshall, Greenlawns, Eastfield Road,
Royston, England
Filed Mar. 31, 1960, Ser. No. 19,046
Claims priority, application Great Britain Apr. 3, 1959
9 Claims. (Cl. 103—124)

This invention relates to rotary pumps, and like rotary machines such as blowers, compressors and expanders. It is an object of the invention to provide machines of this kind of generally improved construction.

According to the present invention, a rotary pump or like rotary machine comprises a rotary chamber with a fluid inlet and outlet, an outlet valve, a rotor and driving connections thereto which rotor is of smaller cross-section than the chamber and is caused to perform in the chamber a continuous unidirectional rotary or orbital motion that transfers a region where the rotor and rotor chamber wall are in sealing proximity progressively around the rotor chamber periphery so as to impel fluid from the inlet to the outlet, and a barrier element to prevent fluid so impelled to the outlet from escaping back past the rotor to the inlet which barrier element is in sealing relationship with the rotor periphery and performs an oscillating or reciprocating movement, as distinct from a unidirectional rotary movement, toward and away from the rotor chamber axis as the rotor travels.

In the preferred form, the rotor chamber is cylindrical or substantially cylindrical and mounted eccentrically in the chamber to rotate about the chamber axis. The barrier element can be a pivoted arm or plate member that is either spring-urged into contact with the rotor periphery or is oscillated by a drive in synchronism with the rotor, for example taken from the rotor and shaft assembly, so as to maintain a close running clearance with the rotor periphery without actually contacting it.

The driving connections between the arm or plate member and the rotor shaft may comprise one or more eccentrics on the rotor shaft outside the rotor chamber with a connecting rod or rods between the eccentric or eccentrics and the plate member.

Or the driving connections to the arm or plate member may comprise eccentric means on the shaft within the rotor chamber. Thus, in one arrangement, the rotor can have an outer sleeve that is rotatable on an inner hub or bearing portion, and the driving connections can comprise a pivotal connection between the plate member and a bracket or the like on the periphery of the rotor sleeve.

Alternatively, the barrier element can be a free piston that is spring-urged into contact with the rotor periphery and can, if desired, be employed to perform useful work on its own account, for example as a reciprocating second stage of a compressor in which the first stage output is provided by the rotor.

In a further arrangement, the barrier element can take the form of a reciprocating divider plate that is integral with a hollow drum or sleeve constituting the outer portion of the rotor, this sleeve being arranged for rotation with respect to an inner bearing or hub portion of the rotor as before. The divider plate can extend out of the rotor chamber and be received for sliding in a bearing mounted in the casing which bearing is also arranged to permit angular or rocking motion of the divider plate about an axis parallel to the rotor axis as the rotor travels round in the pump chamber.

The above and other features of the invention will be apparent in the following description, given by way of example of various pump or compressor constructions embodying the invention, reference being had to the accompanying diagrammatic drawings in which:

FIGURE 11 is a plan of the rotor and shaft assembly of the embodiment of FIGURE 10, FIGURES 12 and 13 are respectively a cross-section and an underneath plan of a particular construction of rotor for the embodiment of FIGURES 10 and 11, and FIGURES 14 and 15 are cross-sectional elevations of a further embodiment.

Figure 1:
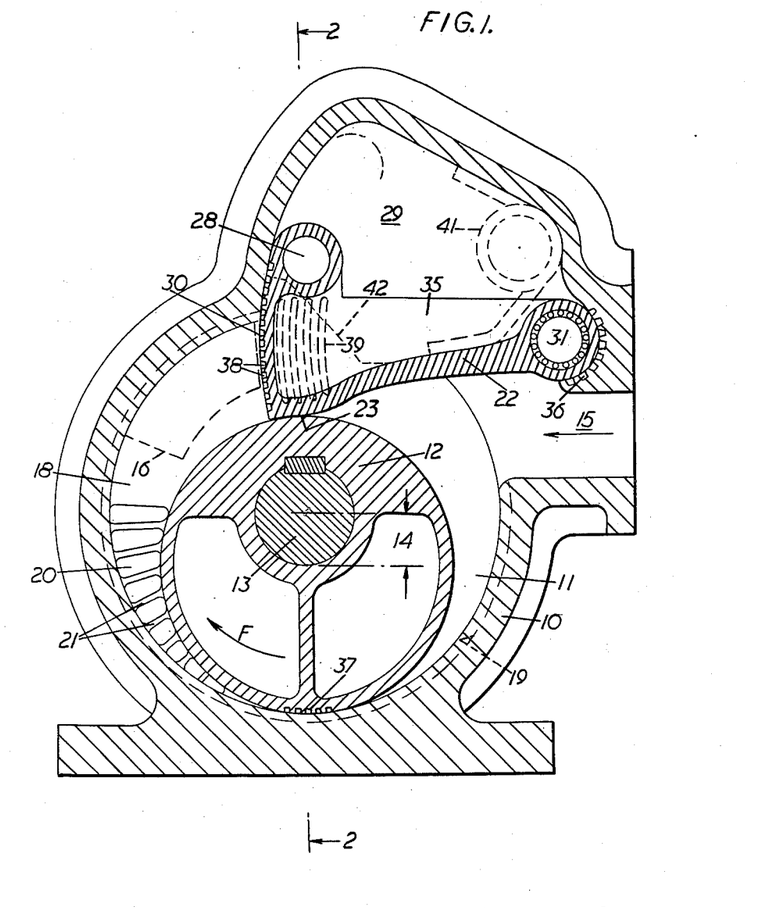
FIGURE 1 is an elevation of one embodiment in cross-section on the line 1—1 of FIGURE 2.
Figure 2:
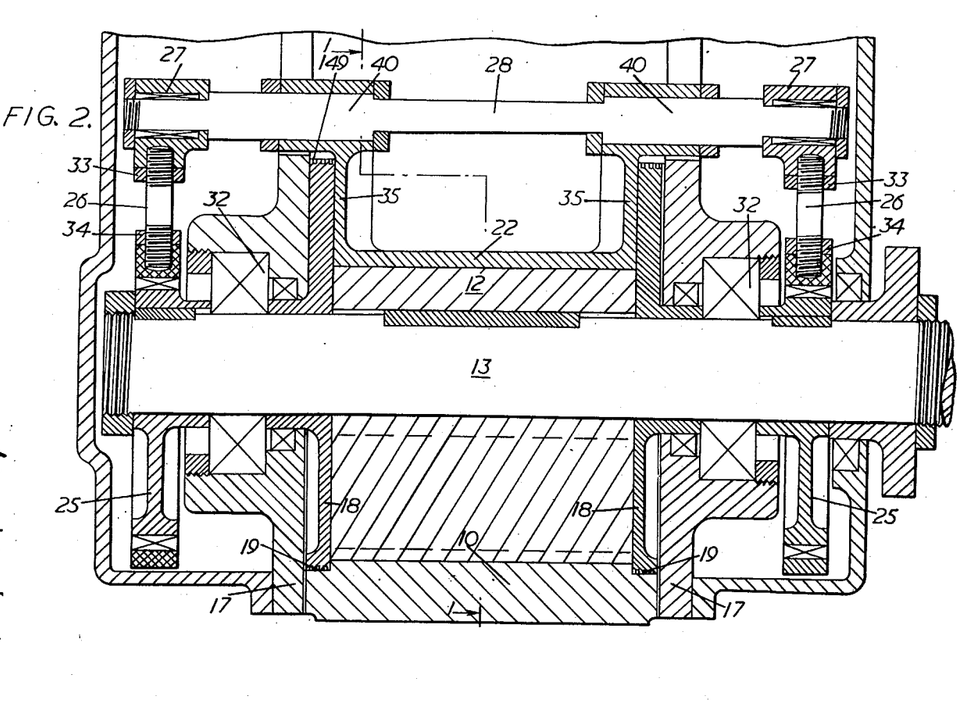
FIGURE 2 is a longitudinal elevation in section on the line 2—2 of FIGURE 1.

Referring firstly to FIGURES 1 and 2, the pump shown has a stator casing 10 with a cylindrical pump chamber 11 in which works a cylindrical rotor 12 that is mounted eccentrically on a shaft 13 extending coaxially through the chamber 11. The amount of eccentricity of the rotor is shown at 14. The rotor operates with a small running clearance between its periphery and the bore wall of the casing 10 so that actual contact between these does not take place. The casing 10 has an inlet port 15 opening into the chamber 11 through its peripheral wall, and outlet ports 16 are provided in each of two end plates 17 that close in the ends of the pump chamber 11. The rotor 12 has two circular end plates 18 that rotate therewith and are concentric with the shaft 13 and the chamber 11. The rotor end plates 18 are of slightly greater diameter than the major portion of the chamber 11 and they fit into narrow enlarged diameter portions 19 of the chamber 11 at opposite ends thereof where again there is a running clearance both at the peripheries of the rotor end plates and at their side faces. In each rotor end plate 18 is a rotary port 20 to cooperate with the stationary port 16 in the adjacent pump chamber end plate, and the rotary port 20 is divided up into segments by radial sealing strips 21.

As the rotor rotates in the direction of the arrow F, fluid entering the pump chamber 11 through the inlet port 15 is carried round by the rotor and expelled through the stationary end ports 16 when the rotary ports 20 come into register therewith. To keep the inlet and outlet sides of the pump chamber separated from one another as the rotor 12 rotates an oscillating arm or plate member 22 is provided which has a surface 23 maintained in close proximity to the peripheral surface of the rotor. The plate member 22 extends the length of the rotor 12 but is just sufficiently shorter than the rotor to provide a running clearance between the ends of the plate member and the inner faces of the rotor end plates 18. The purpose of the sealing strips 21 across the rotary ports 20 is to prevent the escape of the fluid medium back to the inlet side of the pump past the ends of the plate member 22 when these ports are passing the plate member. Each charge of the fluid medium is completely expelled through the outlet ports by the time that the rotor reaches its top dead centre position, i.e. 180° from the position shown in FIGURE 1.

The plate member 22 oscillates in the pump casing about a ball or roller bearing mounting 31 and is driven by a pair of eccentrics 25 that are mounted on the rotor shaft 13 outside of the pump chamber end plates 17. The drive is transmitted from the eccentrics by connecting rods 26 to a pair of bearings 27 that receive opposite ends of a cross rod 28 passing through the oscillating plate member 22. In this way the movements of the plate member 22 are closely controlled in synchronism with the rotation of the rotor 12, and the plate member 22 is caused to maintain a close running clearance between the rotor and its own surface 23 without actually coming into contact with the rotor. The surface 23 is profiled so that it shall cooperate with the rotor periphery in maintaining a pre-set running clearance at all relative positions; this may be of the order of .002″.

The plate member 22 moves into and out of a chamber 29 in the casing 10 as it oscillates, and both around the location of the bearing axis about which it oscillates, and at its face 30, the plate member is designed to have a small running clearance between itself and the walls of the chamber 29. The face 30 of the plate member is part of a cylindrical surface generated about the axis of the bearing mounting 31, as is also the cooperating wall of the chamber 29. The fluid pressure acts on the plate member 22 in a direction substantially normal to the face 30, and so the fluid loads are taken by the bearing mounting 31 and not by the eccentrics and connecting rods. The design of the plate member 22 provides for strengthening webs to ensure that no distortion takes place under high fluid loads.

The rotor shaft rotates in anti-friction bearings 32, and if the rotational speeds are not abnormally high these and the other bearings can be grease lubricated and no oil lubrication is necessary, there being no frictional contact between the rotor and the plate member 22, or between either of these parts and the casing. The fluid medium will not therefore be contaminated with oil.

To enable the running clearance between the plate member 22 and the rotor 12 to be adjusted the opposite ends of each connecting rod 26 are provided with right and left-hand threads respectively so that the effective length of the connecting rods can be adjusted. Two locknuts 33, 34 are slackened off before adjustment and re-tightened when the correct clearance is established.

The rotor 12 can be fully balanced in the manner shown in FIGURE 1 if the eccentricity 14 is not too large; with larger eccentricities full rotational balance is obtained by designing the rotor end plates 18 to counterbalance the rotor as shown in FIGURE 2.

To reduce undesirable flow of the fluid medium through the various clearance gaps, the casing walls, the rotor periphery and the face 30 and end faces 35 of the plate member 22 are grooved as shown at 36, 37, 38 and 39.

In the construction shown the cross-rod 28 does not rotate with respect to the plate member 22, the rotation taking place in the bearings 27. However, if desired the bearings 27 can be replaced by bearings at the positions 40 on the plate member so that the cross rod 28 can be secured directly to the two connecting rods 26. The portion of the cross rod 28 between the positions 40 can be omitted, if desired, to lighten the plate member 22.

A simpler and cheaper version of the machine can be constructed by omitting the eccentric and connecting rod drive to the plate member 22 and merely providing a spring or springs, as indicated at 41 in FIGURE 1, to urge the plate member against the rotor. With this arrangement the height of the plate member 22 can be reduced to, say, that indicated by the dotted line 42 in FIGURE 1, and the plate member does not need a specially profiled face at 23. As mentioned previously, the plate member is designed so that the fluid loading is taken by its bearing mounting and therefore the spring 41 does not have to combat fluid loading but simply the inertia loading of the plate member. Since the plate member and rotor are now in continuous frictional engagement oil lubrication of the pump chamber is ordinarily required. It is, however, possible to run such a machine without oil lubrication if the plate member 22 is fitted with an anti-friction carbon plate.

The machine can effect internal compression of the fluid medium, the compression ratio depending on the dispositions of the ports 16, 20 which determine the time in the cycle at which outlet port opening occurs. The valving arrangement shown provides a fixed pressure ratio for a given port design, but if a variable ratio is required the rotary valving can be dispensed with and an oscillating valve, such as a disc valve, provided on the outlet external to the pump chamber. The rotary valving arrangement is, however, desirable at higher speeds as it is not subject to inertia difficulties.

In order to enable the pump to operate at reduced loadings and with a reduced throughput at any given speed of rotation, which is required in many applications and especially for refrigeration compressors, a by-pass port can be provided in the peripheral wall of the pump chamber. This port is controlled by a by-pass valve and leads into a duct that by-passes fluid medium back to the inlet tract of the pump. When the valve is open the pump does not start to do work until after the rotor has passed the by-pass port opening, so that the pump displacement and the power absorbed by the pump are reduced according to the position of the by-pass port.

Another method of unloading, applicable to the arrangement in which the oscillating plate member is spring-urged into contact with the rotor, involves the provision of means for lifting and holding the plate member 22 away from the rotor against the action of its spring. With this construction it is also necessary to have an external valve or valves to close off the outlet tract.

Figure 3:
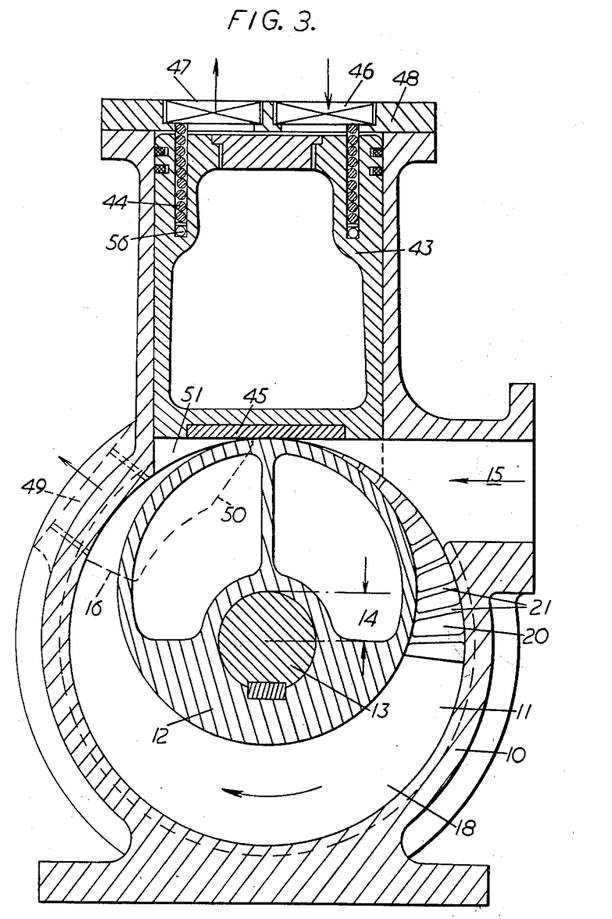
FIGURE 3 is a cross-sectional elevation of a second embodiment.

Referring now to FIGURE 3, in this embodiment the oscillating plate member is replaced by a free piston 43 that is urged into contact with the rotor by a spring 44. A hardened steel wear plate 45 is carried in the bottom face of the piston and oil lubrication is provided between the piston and rotor faces. Alternatively, if a carbon or other anti-friction plate is employed and the pressure in operation between the piston and the rotor is not too great the machine can be run dry. Running without oil lubrication would call for carbon or other anti-friction piston rings, or alternatively the piston could be operated with a clearance between it and the cylinder wall, there being a guide rod for the piston extending through the top cover and preferably circumferential grooves around the piston to improve sealing.

The particular advantage of this embodiment is that the piston can be employed as a free piston compressor, for example as the second stage in a machine of which the rotary portion constitutes the first stage. For this purpose inlet and outlet ports 46, 47 are provided in the top cover 48 of the cylinder and appropriate inlet and outlet valves are fitted. The fluid medium is taken from the outlet 49 of the first stage and passed through an intercooler to the inlet 46 of the second stage. The dimensions of the embodiment shown in FIGURE 3 are such as can provide a first stage with about three times the displacement of the piston stage.

However, if desired the rotary and free piston stages can be operated in parallel, in which case the fluid loading on the piston is much reduced and consequently the friction load on the rotor 12 is much less.

In the embodiment of FIGURE 3, the machine can be unloaded by providing means to raise and hold up the piston against the action of its spring. This stops reciprocation of the piston and allows the rotor to rotate without doing work.

In order to prevent leakage back to the inlet side of the rotary stage through the rotary ports 20, the shape of each outlet port is modified in FIGURE 3 as shown at 50. It will be seen that there is a dead volume at 51 but this is not large enough to be a particular disadvantage because of the fact that the base of the piston is circular. However, it can be eliminated by bringing the base of the piston down in an arc. The other side of the piston base can be correspondingly curved down or left flat as desired.

Figure 4:
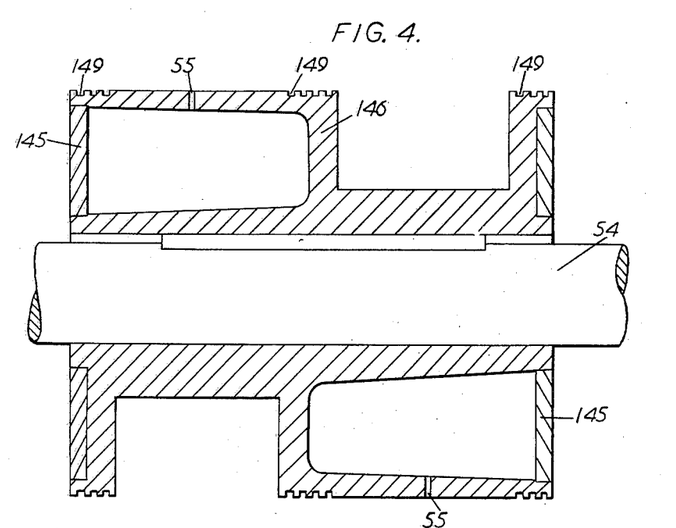
FIGURE 4 shows a particular form of rotor construction in longitudinal section.

FIGURE 4 shows two integral eccentric rotors 52, 53 mounted on a common shaft 54 for use in a single common casing, these rotors being displaced 180° with respect to one another. Each of these rotors can operate in conjunction with a separate free piston. There can be more than two rotors on a common shaft, for example three rotors at 120° to one another. A small bleed hole 55 is shown for the release of air pressure in the trapped volume of each rotor. If desired, oil lubrication can be brought down the shaft 54 into the rotor interiors and thence out via the holes 55 to lubricate the rotor peripheries.

The double rotor assembly has two end plates 145, equivalent to the end plates 18 of FIGURES 1 and 2, and also a central dividing plate 146 which serves to divide off the common casing space into two rotor chambers. Both in FIGURE 2 and in FIGURE 4 the rotor end plates, and the central plate 146, have peripheral sealing grooves 149.

As an alternative to the arrangement of FIGURE 4, a double rotor arrangement can be formed by dividing one straight rotor length by a central circular disc, i.e. the two rotors are in phase with one another instead of 180° out of phase. This arrangement, as well as the previous double-rotor arrangement, can be operated in a two-stage manner. Pistons operating in conjunction with the rotors can be arranged on the same side of the pump chamber with their axes in the same plane, or displaced 180° from one another.

In any of the free piston arrangements, the piston can be arranged to act merely as a rotor sealing member, or it can be used for some duty quite distinct from the operation of the main rotary pump.

To improve side sealing between the piston and the end plates of the rotor the piston can be provided with two diametrically-opposed flats. That means that the full diameter of the piston will be slightly more than the length of the rotor between the end plates.

If the piston has flats or its bottom face is curved in an arc as previously described it cannot rotate in its cylinder, but in arrangements where it is able to rotate such rotation can be beneficial in promoting uniform wear of the bottom face. Rotation can be encouraged by providing, at the bottom of the spring recess in the piston, a washer and a ring of balls 56 (FIG. 3) interposed between the spring 44 and the piston.

Figure 5:
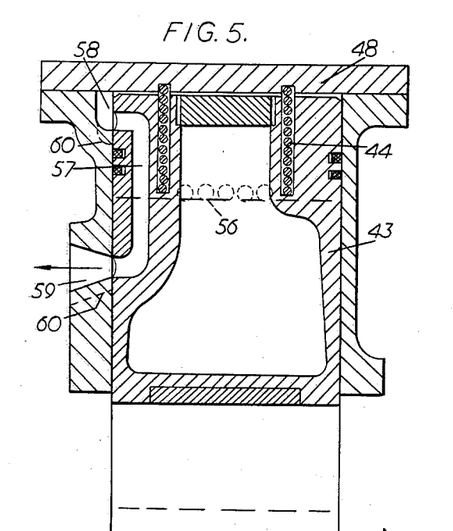
FIGURE 5 shows a modification of the embodiment of FIGURE 3.

FIGURE 5 shows a piston arrangement in which the inlet and outlet valves and the ports in the cylinder cover have been replaced by ports in the wall of the cylinder. On the down stroke of the piston a partial vacuum will be created after the opposite ends of a passage 57 in the piston have moved out of register respectively with the outlet port 59 and with a recess 58 in the cylinder wall near the top of the cylinder. Fluid will enter when the top of the piston uncovers the inlet ports 56, and this will be compressed during the upstroke until the piston has risen high enough for the charge to be delivered through the recess 58 and the passage 57 to the outlet port 59. The compression ratio can be altered by altering the depth of the recess 58 and outlet port 59 as shown by the dotted lines 60.

In some cases, such as when the piston is performing duty as an exhauster or vacuum pump, the passage 57 in the piston wall can be dispensed with and the interior of the piston utilised. In this case communicating holes can be provided in the piston wall at the same positions as the exits of the passage 57.

This ported construction of the piston-and-cylinder portion of the machine has the advantage that high speeds can be employed and there are no valve parts prone to break or otherwise fail and no undesirable valve inertia effects.

Figure 6:
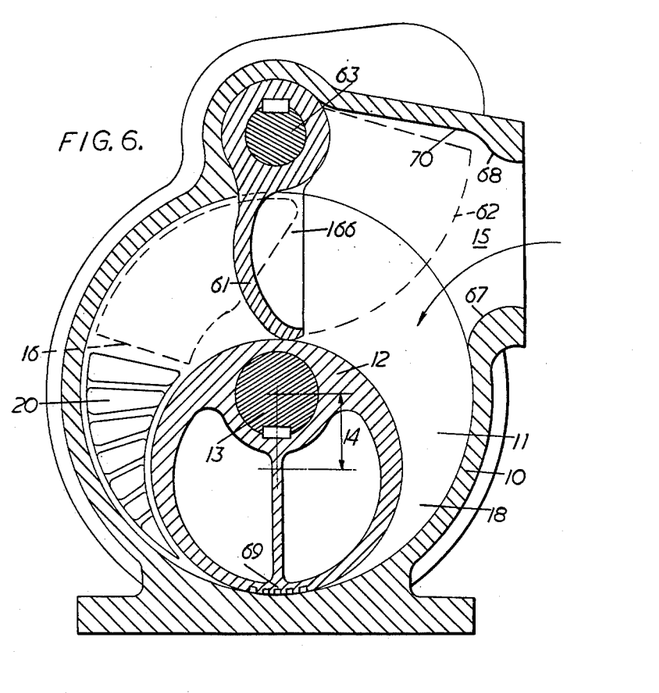
FIGURE 6 is a cross-sectional elevation of a third embodiment.
Figure 7:
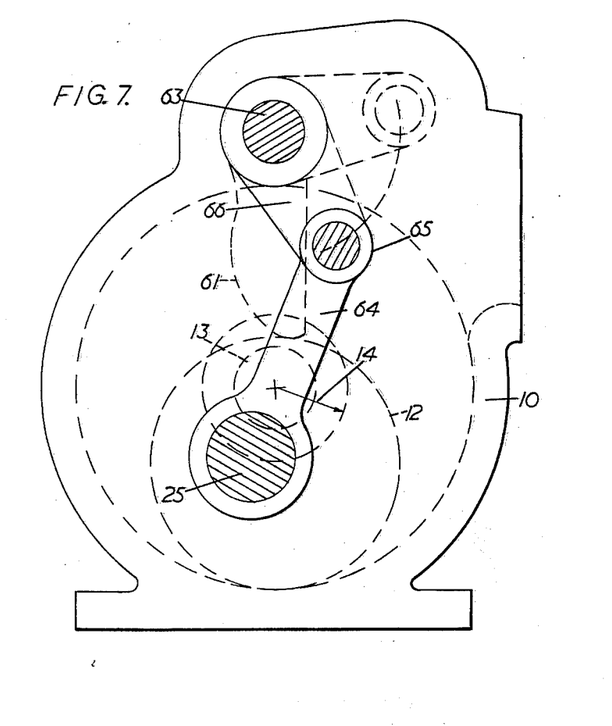
FIGURE 7 is a further elevation of the embodiment of FIGURE 6 showing the outside of the pump chamber.

In the construction illustrated in FIGURES 6 and 7, the rotor 12 is sealed by means of an oscillating plate member as in FIGURES 1 and 2. In this case however the plate member 61 swings angularly in the opposite sense and to a greater extent than the plate member of the previous embodiment, as indicated at 62, and it assumes a substantially vertical position when the rotor is at bottom dead centre. The space to enable the plate member 61 to swing is provided in the casing by giving the fluid inlet 15 an enlarged mouth.

It will be observed that in the construction of FIGURES 6 and 7 the plate member is simpler to manufacture because the closely machined cylindrical surface 30 of the plate member 22 of the construction of FIGURES 1 and 2, and the co-operating surface on the casing, are no longer present. The member 61 is light and is strengthened by webs 166 which also promote cooling.

The plate member 61 is oscillated by means of an eccentric drive from the rotor shaft 13 as before, but now the cross rod 28 through the plate member is eliminated. Instead, the plate member is mounted to rock on a shaft 63 to which it is keyed, and connecting rods 64 from the eccentrics are pivotally connected at their small ends 65 to the arms of cranks 66 on the shaft 63. This arrangement helps to prevent ingress of bearing lubricant to the pump chamber.

A single eccentric, connecting rod and crank combination can be used, if desired, instead of two.

Alternatively, the oscillating plate member 61 can be springloaded into contact with the rotor, as described with reference to FIGURES 1 and 2.

As the plate member 61 oscillates in the path of the incoming fluid medium, a sufficient distance must be present between its tip and the portion 67 of the casing wall at inflow so that there is no restriction to the entry of the fluid. If desired, the inlet can be arranged so that the portion 68 of the casing wall is close to the intersection of the circular path of the rotor tip 69 and the path 62 of the tip of the plate member 61. This causes the plate member 61 to trap fluid against the portion 70 of the casing wall during its back swing, and if this part of the space in the casing is connected by communicating ducts to the pump chamber at a point below the inlet port 15 the trapped fluid is forced into the pump chamber. Whilst the pressure so formed is small it affords a ramming or supercharging effect that increases the volumetric efficiency of the pump and recovers some of the work done by the plate member 61 instead of allowing this member merely to cause useless pulsations in the fluid inlet. The communicating ducts can be arranged to be closed off, for example by the rotor itself, when the plate member 61 has completed its back swing.

The machine can also be operated in the reverse direction with the inlet and outlet interchanged. In this event the plate member 61 can be made solid instead of with webs and it can be arranged to trap and compress against the casing wall at 70 some of the fluid delivered by the rotor, the communicating ducts now being taken to the pump outlet tract instead of the pump chamber.

The loading of this machine can be varied by providing means for adjusting either the crank or cranks 66, or the plate member 61 itself, angularly with respect to the shaft 63, thereby altering the clearance between the plate member and the rotor. Adequate clearance must be allowed at the portion 70 of the casing wall to permit this to be done.

It has been mentioned that the embodiment of FIGURES 6 and 7 represents a way of simplifying the manufacture of the oscillating plate member. The same object can be achieved by reversing the direction of operation of the machine of FIGURES 1 and 2, with transposition of the inlet and outlet, in which case the charge is delivered against the under face of the plate member 22 and accurate machining of the face 30 and the cooperating part of the casing wall is no longer required.

Figure 8:
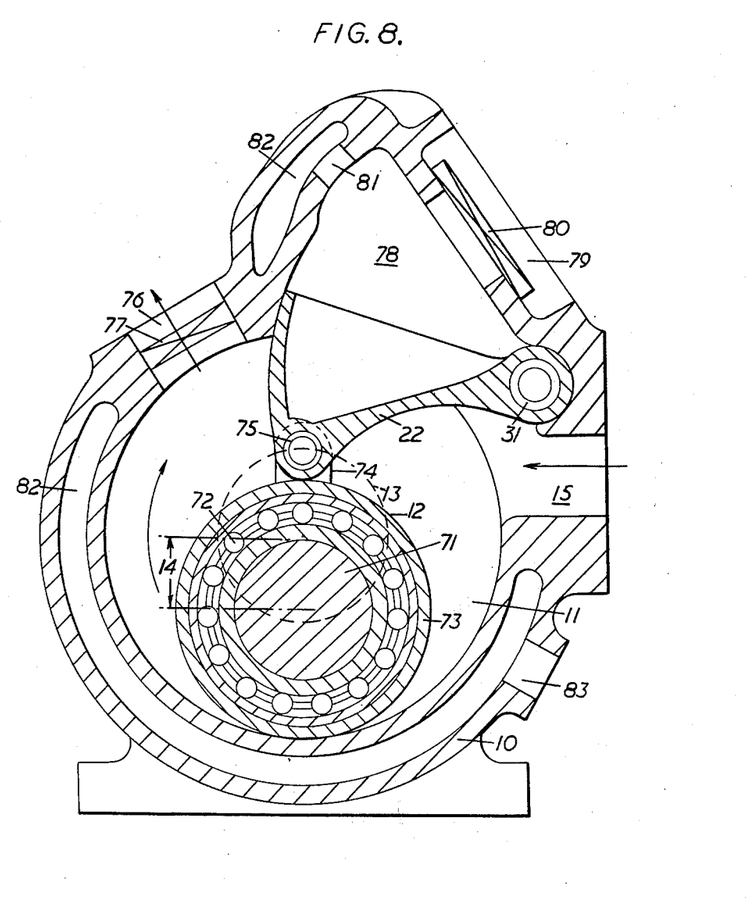
FIGURES 8, 9 and 10 are cross-sectional elevations of additional embodiments.

Referring now to FIGURE 8, this shows another way of driving the oscillating plate member 22. In this construction the rotor shaft 13 is formed as a crank shaft with a crank pin portion 71 in the pump chamber 11 having a throw as indicated at 14, and the rotor 12 comprises a sleeve 73 around the crankpin portion which is free to rotate with respect to the shaft on ball or roller bearings 72. The sleeve 73 has on its periphery a bracket 74 which provides bearings for a pivot pin 75 on the plate member 22. Consequently, as the rotor rotates in the pump chamber the sleeve 73 does not rotate fully but merely oscillates slightly and the connection between the sleeve and the plate member 22 cause the plate member to rise and fall appropriately.

The bearings can be oil lubricated, or alternatively the bearings at 72, 31 and 75 can be packed with grease and sealed. Balancing of the rotor assembly is achieved by weights on the shaft 13, and, if desired, there can be in the form of circular ported end plates that perform a rotary valving function as in FIGURES 1 and 2. However, in the arrangement shown in FIGURE 8 the outlet from the pump chamber 11 is through the peripheral wall of the chamber at 76; this outlet is provided with a clack valve at 77 as indeed an outlet clack valve can be used in place of rotary end plate valving in any one of the embodiments described.

In the embodiment of FIGURE 8, with the particular crank throw shown, the volume displaced by the plate member 22 in the space 78 in the casing is approximately a quarter of the volume displaced by the rotor per revolution. By furnishing this space 78 with an inlet 79 having a clack valve 80, and an outlet 81 communicating with cooling passages 82, the plate member 22 can be made to pump cooling fluid around the casing. The cooling fluid leaves at a discharge port 83.

Alternatively, if cooling is not required, for example in a low pressure pump, the outlet from the space 78 can be provided with an outlet valve and the pumping capacity of the plate member 22 added to that of the rotor 12.

A rotor with a non-rotating sleeve can also be used with advantage in cases where the oscillating or reciprocating sealing member is spring-urged against the rotor, because the sliding friction between the sealing member and the rotor periphery is thus eliminated. If desired, instead of providing ball or roller races in the rotor the rotor sleeve can be made of or lined with anti-friction material.

Figure 9:
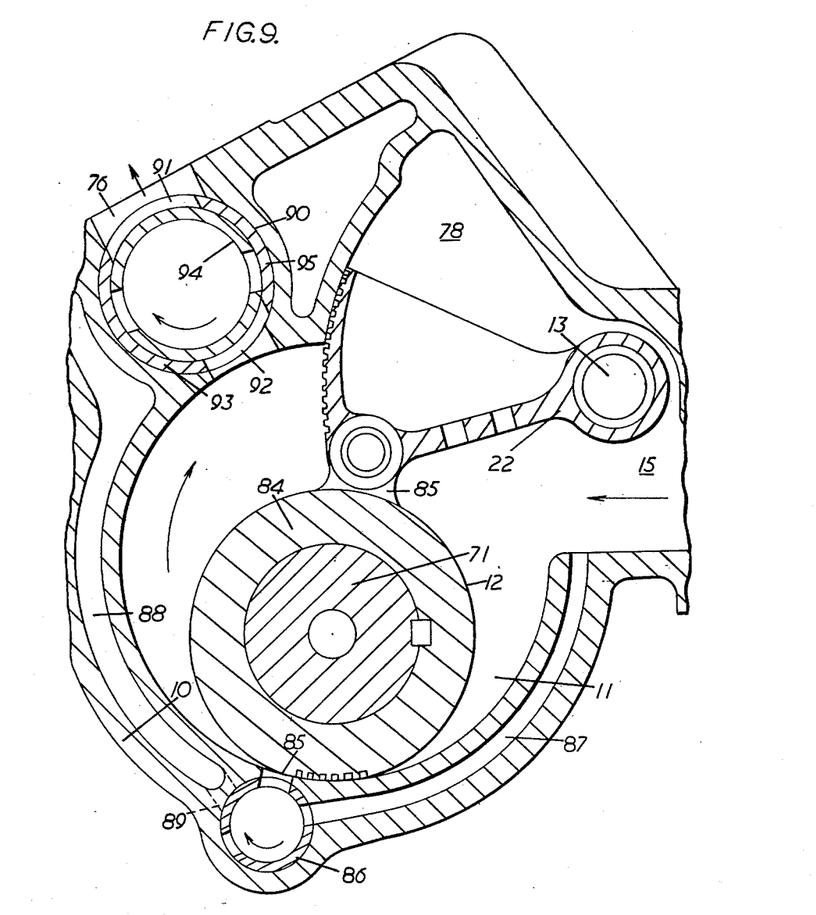

In the construction of FIGURE 9, a rotor sleeve 84 is keyed to the crank pin 71 to rotate therewith and the plate member 22 is driven by a pair of connecting rods 85 on the crank pin at opposite ends of the rotor sleeve. The big ends of the connecting rods are just slightly smaller in diameter than the sleeve 84.

For offloading the machine a by-pass port 85 is provided controlled by a rotary valve 86 and through which fluid may escape back to the pump inlet via a passage 87 in the casing wall. When the machine is used as a pump in a refrigerating system for compressing a refrigerant gas such as Freon or Arcton, the pump casing may be cooled with these gases instead of with water. Thus the valve 86 can afford communication through a port 89 between two cooling passages 87, 88 when the by-pass port 85 is closed, since the by-pass is only in operation for short periods and the pump does not generate much heat when offloaded.

To vary the compression ratio, a rotary outlet valve 90 is provided in the outlet 76 from the pump chamber 11. The valve 90 comprises a sleeve 93 with angularly adjustable ports 91, 92 and a valve cylinder 94 that is rotated within the sleeve. In the arrangement shown, which is specifically for low pressure applications, the valve cylinder rotates in the same direction as the pump rotor and at half the speed. The valve cylinder is ported to provide passage for fluid and the ports come into register with the sleeve ports 91, 92 once for each revolution of the pump rotor. It will be seen that by angular adjustment of the sleeve 93 as a whole, or simply of the sleeve portion 95, the outlet can be caused to open later or earlier in the cycle thereby varying the amount of compression achieved in the machine.

For higher pressures, the rotory valve will be arranged to rotate at the same speed as the rotor 12, only one port then being provided in the valve cylinder 94 and the outlet being taken through the end of the valve instead of from the valve circumference through the port 76. The direction of rotation of the valve is not material and it can be designed to run in either direction according to convenience.

The valve cylinder 94 can be rotated by a drive from the rotor shaft, and the valve sleeve 93 can, if desired, be arranged for automatic adjustment by means, such as a differentially-loaded piston, responsive to the pressure in the outlet tract of the pump. The valve can, in this way, be arranged not to open until the pressure in the pump chamber rises to that in the outlet tract. Preferably, the valve cylinder 94 is mounted in bearings external to the bore and sleeve in which it works, a running clearance being provided between the valve cylinder and the sleeve. If variable compression is not required the adjustable sleeve is, of course, not needed.

Figure 10:
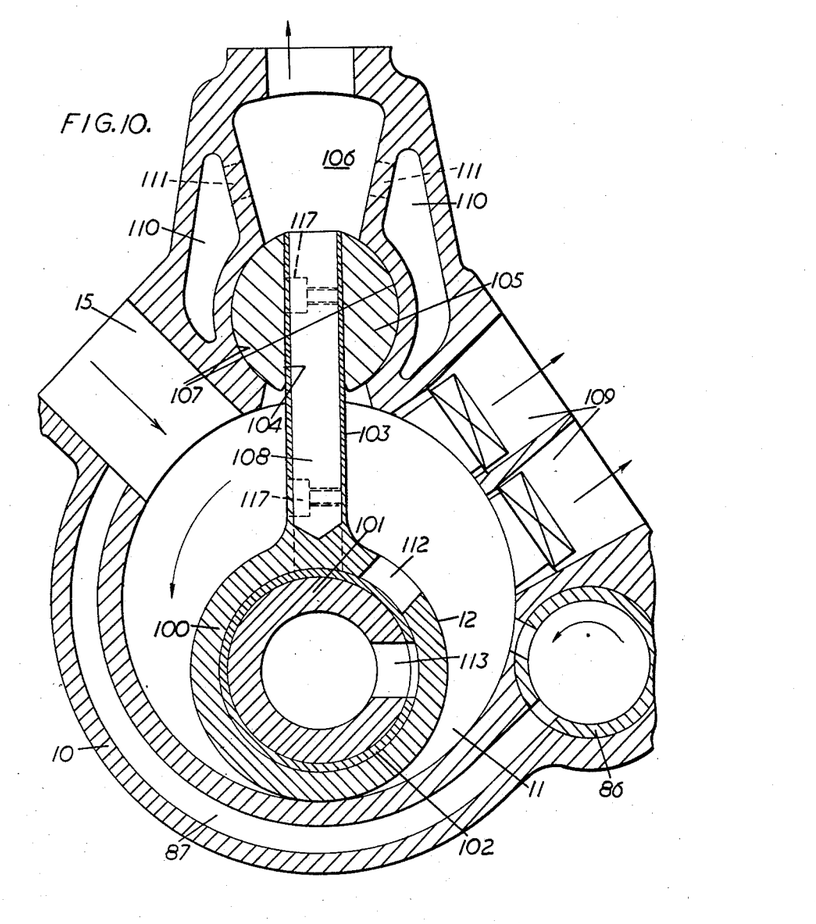
Figures 11, 12:
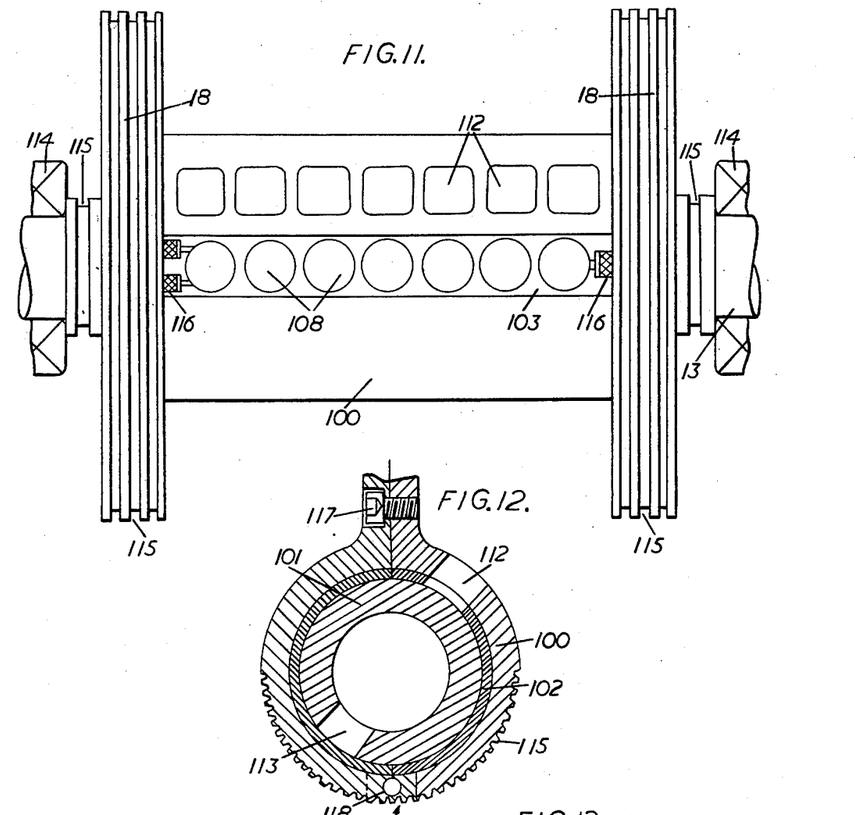

In FIGURES 10 and 11, the pump rotor 12 again comprises a rotor sleeve 100 around a crank pin 101, with interposition of a bearing liner or layer of anti-friction material 102 between the sleeve and the crank pin. In this case sealing is effected by a flat web-like extension or divider plate 103 along one side of the sleeve 100 and integral therewith. The divider plate 103 slides in a guide slot 104 formed in a bearing 105 that is disposed in a trunk or passageway 106 leading out of the pump chamber 11. The bearing 105, which may consist of two part-cylindrical elements on opposite sides of the divider plate, or a single shaft slotted through, is arranged to oscillate angularly between part-cylindrical surfaces 107 of the trunk 106 about an axis parallel to the rotor axis.

It is preferred that the bearing 105 be mounted to operate with a close running clearance between the surfaces 107 to minimise wear and the need for lubrication, although some lubrication must be provided as the divider plate is a close sliding fit in the bearing slot. The divider plate 103 is provided with lightening holes 108.

As in previous embodiments, pump delivery can take place through an outlet port or ports provided with a clack valve or valves and situated at the periphery of the pump chamber as indicated in dotted lines at 109. In this case the trunk 106 can be employed for introducing cooling medium to the interior of the divider plate 103 and to cooling passages 110 by way of ports indicated in dotted lines at 111.

However, as illustrated, this embodiment is arranged for delivery, of the compressed fluid charge to the crank pin 101 which is hollow, and thence through the holes 108 in the divider plate 103 to the trunk 106. To this end, ports 112, 113 are provided in the rotor sleeve 100 and the crank pin 101 respectively, these ports coming into register once every cycle and giving the machine a predetermined compression ratio. As will be seen the ports 113 serve to bring the ports 112 into communication with the holes 108 which are extended down through the rotor sleeve 100. With this arrangement the ports 111 are not provided and cooling medium is introduced to the passages 110 otherwise than through the trunk 106.

The crankshaft 13, of which the crank pin 101 forms a part, is journalled in bearings 114 (FIGURE 11) and carries circular rotor end plates 18. Grooves 115 to improve sealing can be provided in the rotor sleeve periphery (FIGURES 12 and 13), in the peripheries of the rotor end plates 18, and in the shaft 13 between the end plates 18 and the bearings 114. Shaft seals or split rings may be provided in the grooves in the shaft and end plates. The end edges of the divider plate 103 can likewise be grooved, with spring or pressure-loaded sealing strips in the grooves if desired. FIGURE 11 shows pressure-loaded sealing strips 116 at these locations.

Figure 13:
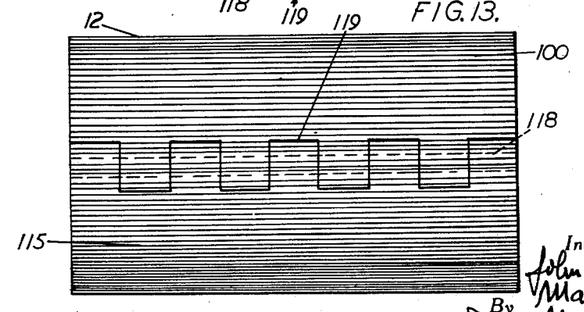

If a built-up crankshaft is used the rotor sleeve and divider plate can be made in one piece, but if the crankshaft is made in one with the end plates 18 as a solid forging then the rotor sleeve and divider plate are split as shown in FIGURES 12 and 13 for assembly purposes. The bearing 102 is also split. The two halves of the sleeve and divider plate are held together, when assembled on the crank pin, by bolts 117 and a pin 118 which is driven longitudinally through a portion of the sleeve at the underside thereof where the two halves are mortised together as shown at 119 (FIGURE 13). Apertures are provided in the end plates 18 to allow insertion of the pin 118, and when the pin is home the ends of the hole into which it has been driven are peened over to ensure that it cannot work out.

As an alternative to providing for fluid discharge through the divider plate 103 and trunk 106, the crankshaft 13 can be made hollow to the exterior of the pump chamber 11 to afford the fluid outlet.

Figure 14:
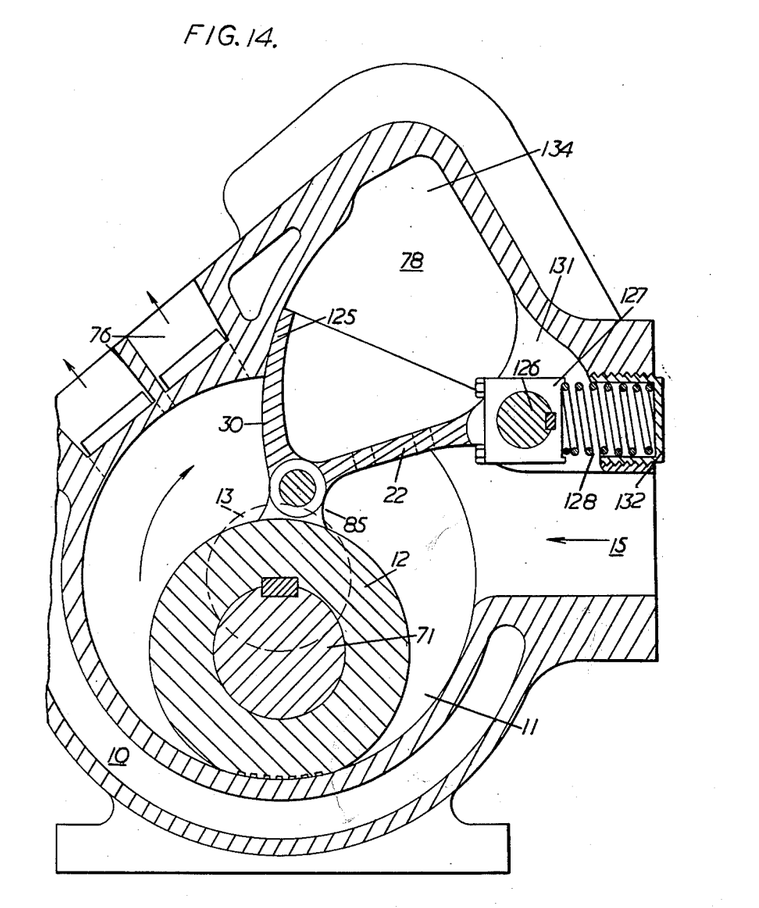
Figure 15:
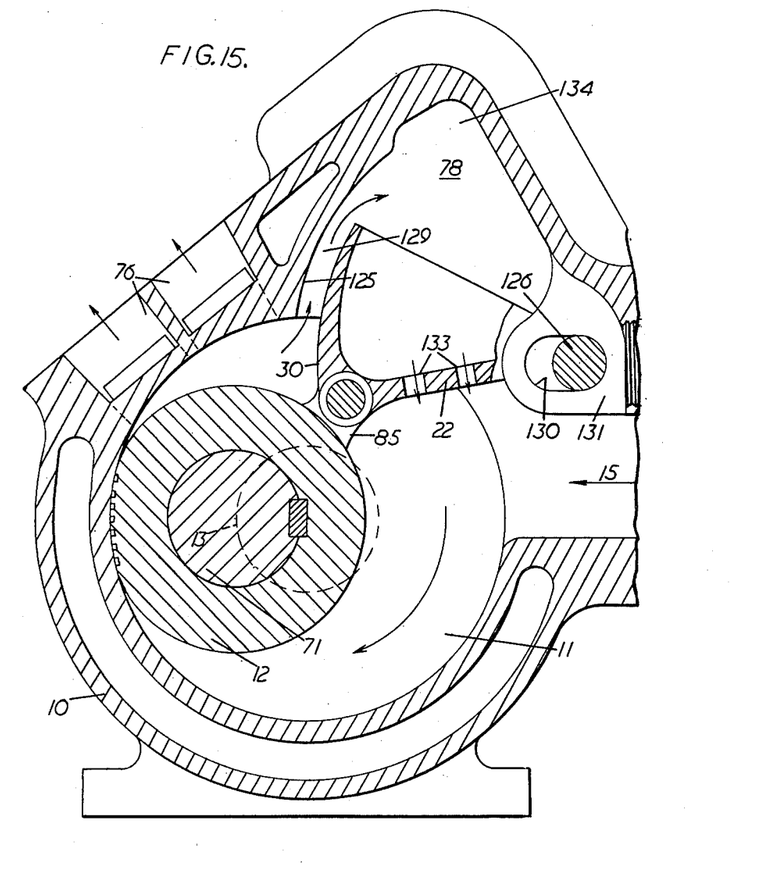

In FIGURES 14 and 15, an arrangement is shown in which provision is made for the rapid release of trapped liquid on the compression side of the pump chamber. When a pump or compressor is used in a refrigeration system there is, with some refrigerating cycles, a possibility that there may occur, when refrigerant in the gaseous state is being compressed, a carry-over in the pump of refrigerant in the liquid form. As liquids are relatively non-compressible this necessitates some means for almost instantaneous liquid release in the event of an overpressure developing in the pump. In general, the ordinary outlet valve area is too restricted to allow the liquid to escape sufficiently rapidly to remove all risk of damage to the pump in these circumstances.

The arrangement of FIGURES 14 and 15 is generally similar, insofar as the arrangement of the rotor and the sealing plate member 22 is concerned, to that of FIGURE 9, except that the plate member 22 is able to retract away from the portion 125 of the casing wall in the event of an overpressure occurring on the face 30 of the plate member. This enables any liquid that has become trapped between the rotor 12 and the plate member 22 to escape rapidly into the space 78 without damaging the machine.

In FIGURE 14 the plate member 22 is mounted to oscillate on a shaft 126 and this shaft is carried in split blocks 127 loaded by springs 128. These springs 128 normally keep the plate member 22 and shaft assembly 126 at the leftward limit of their travel, as seen in the drawing, so that the face 30 of the plate member is in sealing proximity to the portion 125 of the casing wall. If, however, an overpressure develops on the face 30 of the plate member the plate member will be forced back to the right against the action of the springs 128 so as to leave a passage 129 (FIGURE 15) between the face 30 and the portion 125 of the casing wall through which liquid can escape.

The shaft 126 passes through slots 130 formed in internal lugs 131 that project inwardly from the casing wall at opposite ends of the shaft-mounted portion of the plate member 22. The slots 130 thus limit the travel of the shaft 126. The outer ends of the springs 128 are received in screwed caps 132 fitted into screwed apertures in the casing wall above the fluid inlet 15.

Liquid that has escaped in this way into the space 78 may be allowed to drain through drainholes 133 in the plate member 22 back to the inlet side. However, in some cases, it may be undesirable to permit this liquid to flow back to the inlet port, and other arrangements may be made for drawing off the liquid. For example, the machine can be operated inverted, in which case the liquid will collect at the portion 134 of the space 78 and can be led away through a pipe.

Since the gap 129 through which the liquid escapes extends the full length of the rotor 12 and plate member 22 it is of comparatively large area and provides a means of very rapid escape for the liquid.

In some circumstances it may be desirable to prevent the plate member 22 from returning to its normal operating position too quickly once it has been forced back to the position shown in FIGURE 15. A piston and dashpot or similar device, either pneumatic or hydraulic, can be employed to slow up the rate of return of the plate member, if desired. It will be understood that, as in previous embodiments, when the plate member 22 is in its normal operating position, as shown in FIGURE 14, its face 30 does not make contact with the casing wall at 125 but a small running clearance is maintained. If means is provided for adjustment of the normal position of the shaft 126 in the casing the running clearance at this point can be readily altered.

In all the embodiments described herein where the same part of the rotor surface provides the seal with the casing at all times, this part can be flattened somewhat to give an area seal rather than a line seal.

I claim:
1. A rotary machine comprising a casing enclosing a substantially cylindrical rotor chamber with a fluid inlet and a separate fluid outlet, a rotary drive shaft coaxial with the rotor chamber, a rotor which is substantially cylindrical and of smaller diameter than the rotor chamber and which is mounted eccentrically on said shaft with a portion of its periphery in sealing proximity to a region of the rotor chamber peripheral wall whereby as the shaft rotates said rotor performs a continuous orbital rotation that transfers the region where said rotor and rotor chamber wall are in sealing proximity progressively around the rotor chamber periphery to impel fluid from said inlet to said outlet, said rotor being fast on said shaft to rotate as one therewith whereby always the same portion of the rotor periphery is in sealing proximity to the rotor chamber peripheral wall, a barrier element preventing fluid so impelled to said outlet from escaping back past said rotor to said inlet which barrier element is in the form of a plate member that is pivoted about an axis parallel to the rotor chamber axis and has a portion thereof spaced from its pivot axis to lie in sealing relationship with the rotor periphery, and eccentric means mounted on bearings on the shaft within the rotor chamber and connected to the plate member thereby to maintain said plate member in said sealing relationship while causing said plate member to rock toward and away from the rotor chamber axis about its pivot as the rotor travels round, said shaft and rotor rotating relatively to said eccentric means.

2. A rotary machine as claimed in claim 1, wherein the eccentric means have an eccentric throw selected such that the eccentric means keep the moving plate member continually in a position relative to the rotor to maintain a close running clearance between the plate member and the rotor periphery without actual contact.

3. A rotary machine as claimed in claim 1, wherein the drive shaft is formed in the manner of a crank shaft in that it has an eccentric crank pin portion within the rotor chamber coaxial with the rotor, the rotor comprises a sleeve around said crank pin portion and keyed thereto, and the eccentric means comprise connecting rods having big ends journalled on the crank pin portion of the shaft at opposite ends of the rotor sleeve and small ends pivotally connected to the plate member.

4. A rotary machine as claimed in claim 1, wherein a by-pass passage is provided for conveying fluid in the rotor chamber back to the inlet for the purpose of off-loading the machine, the by-pass passage having at least one port opening into it at the periphery of the rotor chamber and being controlled by an off-loading valve.

5. A rotary machine as claimed in claim 1, wherein the rotor chamber has stationary end walls and rotary end plates immediately inside the end walls, which end plates are affixed to the ends of the rotor to rotate therewith about the axis of the rotor chamber, and the fluid outlet from the rotor chamber is by way of these end walls and end plates which are provided with cooperating ports that come into register once for each cycle of travel of the rotor around the chamber.

6. A rotary machine as claimed in claim 5, wherein the end plates are circular and are concentric with and of slightly greater diameter than the rotor chamber which is cylindrical, said end plates operating with running clearance in narrow end portions of the rotor chamber bore that are of slightly greater diameter than the main portion of the chamber.

7. A rotary machine as claimed in claim 1, wherein the rotor chamber outlet is provided with a rotary valve comprising a valve cylinder that rotates continuously in a stationary ported sleeve, the valve cylinder being ported and flow through the valve taking place when the cylinder and sleeve ports come into register, and the sleeve ports are angularly adjustable to vary the cycle time at which the ports come into register and hence the compression ratio of the machine.

8. A rotary machine as claimed in claim 1, wherein the pivotal mounting of the plate member is adjacent the rotary chamber inlet and the plate member sustains the fluid pressure in the outlet side of the rotor chamber upon a surface of said plate member that is of substantially part-cylindrical form generated about the axis of the pivotal mounting as centre.

9. A rotary machine as claimed in claim 8, wherein the plate member, which is ordinarily disposed with its pressure-sustaining surface in sealing proximity to a portion of the machine casing wall, is arranged to retract against spring-loading to open a gap between said surface thereof and said wall portion for the escape of fluid to the inlet in the event of overpressure occurring on said surface.

References Cited in the file of this patent

UNITED STATES PATENTS

| | | |
|---|---|---|
| 663,184 | Morris | Dec. 4, 1900 |
| 678,338 | Harger | July 9, 1901 |
| 730,081 | Bates | June 2, 1903 |
| 767,442 | Robinson | Aug. 16, 1904 |
| 922,189 | Pratt | May 18, 1909 |
| 1,007,033 | Kinney | Oct. 24, 1911 |
| 1,079,561 | Kinney | Nov. 25, 1913 |
| 1,266,298 | Metcalf | May 14, 1918 |
| 1,380,012 | Petsche | May 31, 1921 |
| 1,624,607 | Leiman | Apr. 12, 1927 |
| 1,876,370 | Weber | Sept. 6, 1932 |
| 2,854,928 | Szczepanek | Oct. 7, 1958 |

FOREIGN PATENTS

| | | |
|---|---|---|
| 977,490 | France | June 4, 1952 |

(1st addition No. 56,100)